United States Patent
Nam et al.

(10) Patent No.: US 12,290,915 B2
(45) Date of Patent: May 6, 2025

(54) REHABILITATION ROBOT CONTROL APPARATUS AND METHOD THEREOF

(71) Applicants: Hyundai Motor Company, Seoul (KR); Kia Corporation, Seoul (KR); Korea Advanced Institute of Science and Technology, Daejeon (KR)

(72) Inventors: Seung Kyu Nam, Seoul (KR); Ju Young Yoon, Suwon-si (KR); Tae Jun Lee, Suwon-si (KR); Beom Su Kim, Yongin-si (KR); Jae Seung Jeong, Daejeon (KR); Jae Hyun Kim, Daejeon (KR); Adedoyin Olumuyiwa Aderinwale, Daejeon (KR); Jun Ha Jung, Seongnam-si (KR); Dong Hwa Jeong, Busan (KR)

(73) Assignees: Hyundai Motor Company, Seoul (KR); Kia Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 311 days.

(21) Appl. No.: 17/664,990

(22) Filed: May 25, 2022

(65) Prior Publication Data
US 2023/0001585 A1    Jan. 5, 2023

(30) Foreign Application Priority Data
Jul. 5, 2021    (KR) .................. 10-2021-0088006

(51) Int. Cl.
*A61H 1/02*    (2006.01)
*A61H 37/00*    (2006.01)
(Continued)

(52) U.S. Cl.
CPC .......... *B25J 11/0005* (2013.01); *B25J 13/087* (2013.01); *G05B 13/027* (2013.01); *G06F 3/015* (2013.01)

(58) Field of Classification Search
CPC .... B25J 11/0005; B25J 13/087; B25J 9/1615; B25J 9/00; B25J 9/16; G05B 13/027;
(Continued)

(56) References Cited

U.S. PATENT DOCUMENTS

2018/0292902 A1\* 10/2018 Min .................. G06F 3/015
2019/0059803 A1\* 2/2019 Myers .................. A61B 5/369
(Continued)

FOREIGN PATENT DOCUMENTS

JP    2012067346 A * 4/2012

OTHER PUBLICATIONS

Ang, Kai Keng et al., "Brain-computer interface-based robotic end effector system for wrist and hand rehabilitation: results of a three-armed randomized controlled trial for chronic stroke", Frontiers in Neuroengineering, Original Research Article, doi: 10.3389/fneng.2014.0030, Jul. 29, 2014, 9 pages.
(Continued)

*Primary Examiner* — Adam R Mott
*Assistant Examiner* — Byron Xavier Kasper
(74) *Attorney, Agent, or Firm* — Slater Matsil, LLP (57) ABSTRACT

An embodiment rehabilitation robot control apparatus includes a brainwave signal measuring device configured to measure a brainwave signal of a user, a preprocessing device configured to preprocess the measured brainwave signal, a classification device configured to classify a motor intention of the user based on the brainwave signal preprocessed by the preprocessing device, and a controller configured to reflect the motor intention of the user in real time to control an operation or a stop of a rehabilitation robot.

20 Claims, 9 Drawing Sheets

(51) Int. Cl.
*B25J 9/16* (2006.01)
*B25J 11/00* (2006.01)
*B25J 13/08* (2006.01)
*G05B 13/02* (2006.01)
*G06F 3/01* (2006.01)
*G06N 3/008* (2023.01)
*G06N 3/08* (2023.01)
*G06N 20/00* (2019.01)

(58) Field of Classification Search
CPC .......... G05B 2219/40305; G06F 3/015; A61H 1/0274; A61H 2201/1659; A61H 2201/5007; A61H 2201/5043; A61H 2230/105; A61H 37/00; A61H 1/02; A61H 2201/1604; A61H 2201/5023; A61H 2201/5076; A61H 1/00; G06N 3/008; G06N 3/08; G06N 20/00
See application file for complete search history.

(56) References Cited

U.S. PATENT DOCUMENTS

| | | | |
|---|---|---|---|
| 2019/0099896 A1* | 4/2019 | Starr | B25J 11/008 |
| 2019/0125612 A1* | 5/2019 | Takai | G06F 3/01 |
| 2021/0107162 A1* | 4/2021 | Kim | G06F 3/0482 |
| 2021/0346096 A1* | 11/2021 | He | A61B 5/37 |
| 2023/0064977 A1* | 3/2023 | Oda | G06F 9/4881 |
| 2023/0104030 A1* | 4/2023 | Dauwels | A61B 5/384 |
| | | | 600/545 |

OTHER PUBLICATIONS

Ang, Kai Keng et al., "A clinical study of motor imagery-based brain-computer interface for upper limb robotic rehabilitation", 31st Annual International Conference of the IEEE EMBS Minneapolis, Minnesota, USA, Sep. 2-6, 2009, 4 pages.

Barsotti, M., et al., "A full upper limb robotic exoskeleton for reaching and grasping rehabilitation triggered by MI-BCI", 2015 IEEE International Conference on Rehabilitation Robotics (ICORR), Aug. 11-14, 2015, 49 pages.

Cheng, Nicholas et al., "Brain-Computer Interface-Based Soft Robotic Glove Rehabilitation for Stroke", IEEE Transactions on Biomedical Engineering, vol. 67, No. 12, Dec. 2020, 13 pages.

Mane, Ravikiran et al., "BCI for stroke rehabilitation: motor and beyond", CrossMark, Open Access, IOP Publishing Ltd., J. Neural Eng. 17, (2020) 041001, Aug. 7, 2020, 22 pages.

* cited by examiner

| Mode | MOTOR INTENTION OR NOT | ROBOT MOVEMENT OR NOT (MUSCLE STRENGTH USE OR NOT) | CONFIGURATION OF CLASSIFIER (CLASSIFY INTENTION) | |
|---|---|---|---|---|
| | | | | ROBOT MOVEMENT OR NOT (MUSCLE STRENGTH USE OR NOT) |
| Passive | X | O | Passive vs. Active (AP CLASSIFIER) CLASSIFY INTENTION OF USER WHILE ROBOT IS IN MOTION | START ROBOT OPERATION BY MOTOR INTENTION |
| Active | O | O | | |
| Rest | X | X | MI vs. Rest (MR CLASSIFIER) CLASSIFY INTENTION OF USER WHILE ROBOT IS STATIONARY | |
| Motor Imagery(MI) | O | X | | |

REHABILITATION ROBOT CONTROL APPARATUS AND METHOD THEREOF

CROSS-REFERENCE TO RELATED APPLICATIONS

This application claims the benefit of Korean Patent Application No. 10-2021-0088006, filed on Jul. 5, 2021, which application is hereby incorporated herein by reference.

TECHNICAL FIELD

The present disclosure relates to a rehabilitation robot control apparatus and a method thereof.

BACKGROUND

Existing rehabilitation treatment proceeds in a manner which repeatedly performs rehabilitation operations passively by a rehabilitation therapist or a rehabilitation robot. However, it is obvious that active rehabilitation treatment in which the intention of a patient is reflected is more effective in restoring a motor function of the patient than the existing passive rehabilitation treatment. Furthermore, brain electrical activity may be identified by means of electrical signals measured by electrodes attached to a head surface of the patient. The measured brainwave (electroencephalogram (EEG)) may be analyzed to classify the intention of a user.

Particularly, when the intention of the patient is reflected in real time to continue controlling a rehabilitation operation, effective treatment for restoring the motor function is facilitated due to an increase in patient concentration and participation in rehabilitation. Thus, there is a need for a technology capable of analyzing a brainwave of the user in real time and controlling rehabilitation treatment.

SUMMARY

The present disclosure relates to a rehabilitation robot control apparatus and a method thereof. Particular embodiments relate to an apparatus for controlling a rehabilitation robot based on a brain computer interface (BCI) and a method therefor.

Embodiments of the present disclosure can solve problems occurring in the prior art while advantages achieved by the prior art are maintained intact.

An embodiment of the present disclosure provides an apparatus for controlling a rehabilitation robot based on a brain computer interface (BCI) and a method therefor.

Another embodiment of the present disclosure provides a rehabilitation robot control apparatus for analyzing a brainwave of a patient and deriving a more effective treatment effect by means of a rehabilitation treatment in which an intention of the patient is reflected and a method therefor.

Another embodiment of the present disclosure provides a rehabilitation robot control apparatus for analyzing a motor intention of a patient and continuing a rehabilitation exercise with suitable strength, when the patient shows an active will for the rehabilitation exercise, to optimize an effect of the rehabilitation exercise and a method therefor.

Another embodiment of the present disclosure provides a rehabilitation robot control apparatus for controlling a rehabilitation exercise based on an intention of a patient in real time when the rehabilitation exercise is in progress, other than a process of starting the rehabilitation exercise in a stop state in a rehabilitation exercise process, to enhance satisfaction with the rehabilitation exercise of the patient and a method therefor.

The technical problems that may be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, a rehabilitation robot control apparatus may include a brainwave signal measuring device that measures a brainwave signal of a user, a preprocessing device that preprocesses the measured brainwave signal, a classification device that classifies a motor intention of the user based on the brainwave signal preprocessed by the preprocessing device, and a controller that reflects the motor intention of the user in real time to control an operation or stop of a rehabilitation robot.

In an embodiment, the classification device may classify the motor intention of the user using a deep learning model based on a convolutional neural network (CNN), a recurrent neural network (RNN), or a long short term memory (LSTM), or a machine learning model based on linear discriminant analysis (LDA) or support vector machine (SVM).

In an embodiment, the classification device may include a first decoder that classifies the motor intention of the user while the rehabilitation robot is operating and a second decoder that classifies the motor intention of the user while the rehabilitation robot is stopped.

In an embodiment, the rehabilitation robot control apparatus may further include a display that displays a real-time classification state for the motor intention of the user.

In an embodiment, the classification device may delete buffer data stored in the first decoder, when the rehabilitation robot changes from an operation state to a stop state, and may delete buffer data stored in the second decoder, when the rehabilitation robot changes from the stop state to the operation state.

In an embodiment, the controller may operate the rehabilitation robot, when a step of classifying the motor intention of the user arrives at an upper threshold in a state where the rehabilitation robot is stopped, and may stop the rehabilitation robot, when the step of classifying the motor intention of the user arrives at a lower threshold in a state where the rehabilitation robot is operating.

In an embodiment, the display may display whether the rehabilitation robot is in an operation state or a stop state in real time by means of a color.

In an embodiment, the display may display a step of classifying the motor intention of the user in real time by means of a graph.

In an embodiment, the preprocessing device may extract a brainwave characteristic based on a band power for one or more brainwave measurement channels.

In an embodiment, the preprocessing device may preprocess the brainwave signal measured by means of a filter including a high pass filter, a band pass filter, and a notch filter.

In an embodiment, the classification device may apply the brainwave signal preprocessed by means of conversion of extracting a brainwave characteristic to a previously learned learning model to classify the motor intention of the user.

In an embodiment, the classification device may apply the brainwave signal converted and preprocessed into an image sequence to a previously learned learning model composed of a CNN or an LSTM to classify the motor intention of the user.

According to an embodiment of the present disclosure, a rehabilitation robot control method may include measuring, by a brainwave signal measuring device, a brainwave signal of a user, preprocessing, by a preprocessing device, the measured brainwave signal, classifying, by a classification device, a motor intention of the user based on the brainwave signal preprocessed by the preprocessing device, and reflecting, by a controller, the motor intention of the user in real time to control an operation or stop of a rehabilitation robot.

In an embodiment, the classifying of the motor intention of the user based on the brainwave signal preprocessed by the preprocessing device by the classification device may include classifying, by the classification device, the motor intention of the user using a deep learning model based on a CNN, an RNN, or an LSTM, or a machine learning model based on LDA or SVM.

In an embodiment, the classifying of the motor intention of the user based on the brainwave signal preprocessed by the preprocessing device by the classification device may include classifying, by a first decoder, the motor intention of the user while the rehabilitation robot is operating and classifying, by a second decoder, the motor intention of the user while the rehabilitation robot is stopped.

In an embodiment, the rehabilitation robot control method may further include displaying, by a display, whether the rehabilitation robot is in an operation state or a stop state in real time by means of a color and displaying, by the display, a step of classifying the motor intention of the user in real time by means of a graph.

In an embodiment, the rehabilitation robot control method may further include deleting, by the classification device, buffer data stored in the first decoder, when the rehabilitation robot changes from an operation state to a stop state, and deleting, by the classification device, buffer data stored in the second decoder, when the rehabilitation robot changes from the stop state to the operation state.

In an embodiment, the reflecting of the motor intention of the user in real time to control the operation or stop of the rehabilitation robot by the controller may include operating, by the controller, the rehabilitation robot, when a step of classifying the motor intention of the user arrives at an upper threshold in a state where the rehabilitation robot is stopped, and stopping, by the controller, the rehabilitation robot, when the step of classifying the motor intention of the user arrives at a lower threshold in a state where the rehabilitation robot is operating.

In an embodiment, the classifying of the motor intention of the user based on the brainwave signal preprocessed by the preprocessing device by the classification device may include applying, by the classification device, the brainwave signal preprocessed by means of conversion of extracting a brainwave characteristic to a previously learned learning model to classify the motor intention of the user.

In an embodiment, the classifying of the motor intention of the user based on the brainwave signal preprocessed by the preprocessing device by the classification device may include applying, by the classification device, the brainwave signal converted and preprocessed into an image sequence to a previously learned learning model composed of a CNN or an LSTM to classify the motor intention of the user.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 9.

Figure 1:
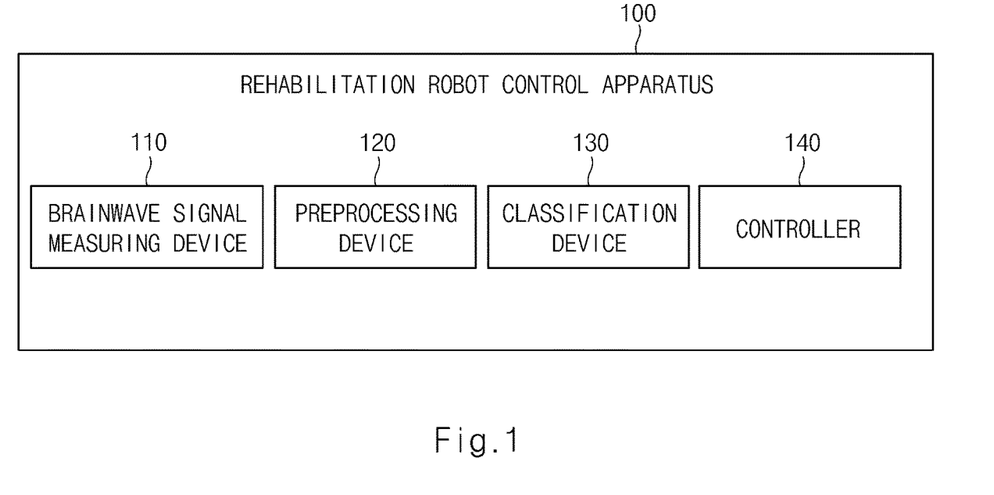
FIG. 1 is a block diagram illustrating a rehabilitation robot control apparatus according to an embodiment of the present disclosure.

FIG. 1 is a block diagram illustrating a rehabilitation robot control apparatus according to an embodiment of the present disclosure.

Referring to FIG. 1, the rehabilitation robot control apparatus 100 may include a brainwave signal measuring device 110, a preprocessing device 120, a classification device 130, and a controller 140.

The brainwave signal measuring device 110 may measure a brainwave signal of a user.

As an example, the brainwave signal measuring device 110 may measure the electro-encephalography (EEG) of the user in real time.

As an example, the brainwave signal measuring device 110 may measure the EEG in real time by means of a neurophysiological measurement method of brain electrical activity through an electrode attached to a scalp of a user.

As an example, the brainwave signal measuring device 110 may be directly or indirectly connected with the preprocessing device 120 through wireless or wired communication to transmit a brainwave signal of the user, which is measured in real time, to the preprocessing device 120.

The preprocessing device 120 may preprocess the measured brainwave signal.

As an example, the preprocessing device 120 may remove a signal and noise, which are not associated with a process of classifying a motor intention of the user, from the measured brainwave signal.

As an example, the preprocessing device 120 may extract a brainwave characteristic obtained by adding band powers for one or more brainwave measurement channels.

As an example, the preprocessing device 120 may preprocess a brainwave signal by means of conversion of extracting a brainwave characteristic such as power spectral density (PSD).

As an example, the preprocessing device 120 may apply characteristic conversion of an alpha wave, a beta wave, a gamma wave, a delta wave, a theta wave, or the like to the brainwave signal to perform preprocessing.

The alpha wave may refer to a brainwave signal having a frequency of 8-13 Hz. The beta wave may refer to a brainwave signal having a frequency of 13-30 Hz. The gamma wave may refer to a brainwave signal having a frequency of 30-60 Hz. The delta wave may refer to a brainwave signal having a frequency of 1-4 Hz. The theta wave may refer to a brainwave signal having a frequency of 4-8 Hz.

As an example, the preprocessing device 120 may preprocess a brainwave signal measured by means of a filter including a high pass filter, a band pass filter, and a notch filter.

As an example, the preprocessing device 120 may be directly or indirectly connected with the classification device 130 through wireless or wired communication to transmit the result of preprocessing the brainwave signal to the classification device 130.

The classification device 130 may classify a motor intention of the user based on the brainwave signal preprocessed by the preprocessing device 120.

As an example, the classification device 130 may classify the motor intention of the user using a deep learning model based on a convolutional neural network (CNN), a recurrent neural network (RNN), or a long short term memory (LSTM), or a machine learning model based on linear discriminant analysis (LDA) or support vector machine (SVM).

As an example, the classification device 130 may apply information where the brainwave signal is preprocessed to a previously learned learning model based on machine learning or deep learning, thus determining whether the user has a motor intention.

As an example, the learning model based on the machine learning or the deep learning may be learned by collecting brainwave data for four modes (passive, active, rest, and motor imagery modes which will be described below with reference to FIG. 4) depending on a data collection experimental paradigm which is preset by an experimenter in a brainwave learning step.

In the brainwave learning step, the experimenter may represent an accurate intention of the user every time in each mode depending on audio and visual instructions.

As an example, the learning model may be learned by means of same-day experimental data or cross-day experimental data. When the learning model is learned based on the cross-day experimental data, a transfer learning scheme may be used.

The cross-day experimental data may refer to data rather than experimental data composed of only data obtained on the day.

As an example, the classification device 130 may apply the brainwave signal preprocessed by means of the conversion of extracting the brainwave characteristic to the previously learned learning model to classify the motor intention of the user.

A description will be given of the process of classifying the motor intention of the user by means of the conversion of extracting the brainwave characteristic and the learning model in the classification device 130 with reference to FIG. 5.

As an example, the classification device 130 may apply the brainwave signal converted and preprocessed into an image sequence to the previously learned learning model composed of the CNN or the LSTM to classify the motor intention of the user.

A description will be given of the process of classifying the motor intention of the user by means of the learning model based on the CNN or the LSTM with reference to FIG. 6.

As an example, the classification device 130 may be directly or indirectly connected with the controller 140 through wireless or wired communication to transmit the result of classifying the motor intention of the user to the controller 140.

The controller 140 may reflect the motor intention of the user in real time to control an operation or stop of a rehabilitation robot.

As an example, the controller 140 may control an operation of the rehabilitation robot which performs a rehabilitation exercise of the user.

As an example, the rehabilitation robot may operate to perform an upper extremity rehabilitation exercise of a stroke patient or the like.

The rehabilitation robot may be implemented in the form of an exoskeleton robot and may be mounted on an arm of a patient to operate to help activities of daily living (ADL) rehabilitation exercise.

As an example, when it is determined that the user has a motor intention in a state where the rehabilitation robot is stopped, the controller 140 may operate the rehabilitation robot.

As an example, when it is determined that the user does not have a motor intention in the state where the rehabilitation robot is stopped, the controller 140 may keep the rehabilitation robot stopped.

As an example, when it is determined that the user has a motor intention in a state where the rehabilitation robot is operating, the controller 140 may keep the rehabilitation robot operating.

As an example, when it is determined that the user does not have a motor intention in the state where the rehabilitation robot is operating, the controller 140 may stop the rehabilitation robot.

As an example, when the step of classifying the motor intention of the user arrives at an upper threshold in the state where the rehabilitation robot is stopped, the controller 140 may operate the rehabilitation robot. When the step of classifying the motor intention of the user arrives at a lower threshold in the state where the rehabilitation robot is operating, the controller 140 may stop the rehabilitation robot.

As an example, the classification device 130 may classify the step of the motor intention of the user into a predetermined number of steps and may calculate a step of the motor intention of the user in real time. When the calculated step of the motor intention arrives at a predetermined upper threshold step, the controller 140 may control to operate the rehabilitation robot. When the calculated step of the motor intention arrives at a predetermined lower threshold step, the controller 140 may control to stop the rehabilitation robot.

Figure 2:
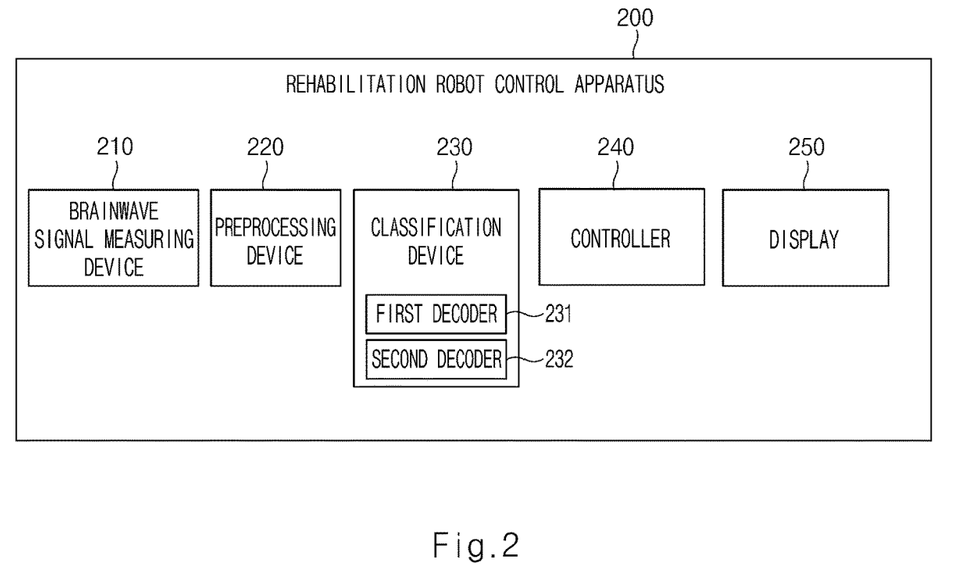
FIG. 2 is a block diagram illustrating a rehabilitation robot control apparatus according to another embodiment of the present disclosure.

FIG. 2 is a block diagram illustrating a rehabilitation robot control apparatus according to another embodiment of the present disclosure.

Referring to FIG. 2, a rehabilitation robot control apparatus 200 may include a brainwave signal measuring device 210, a preprocessing device 220, a classification device 230, a controller 240, and a display 250.

Because the brainwave signal measuring device 210 and the preprocessing device 220 may be the same as the brainwave signal measuring device 110 and the preprocessing device 120 of FIG. 1, a description thereof will be omitted herein.

The classification device 230 may include a first decoder 231 and a second decoder 232.

As an example, the classification device 230 may receive information about whether a rehabilitation robot is operating or stopped from the controller 240.

The first decoder 231 may classify a motor intention of a user while the rehabilitation robot is operating.

As an example, while the rehabilitation robot is operating, the first decoder 231 may determine whether the user is in a state (an active state) where he or she has a motor intention or whether the user is in a state (a passive state) where he or she does not have the motor intention.

As an example, to classify the active state or the passive state according to the motor intention of the user, the first decoder 231 may use a previously learned learning model based on machine learning or deep learning.

The second decoder 232 may classify the motor intention of the user while the rehabilitation robot is stopped.

As an example, while the rehabilitation robot is stopped, the second decoder 232 may determine whether the user is in a state (a motor imagery state) where he or she has a motor intention or whether the user is in a state (a rest state) where he or she does not have the motor intention.

As an example, to classify the motor imagery state or the rest state according to the motor intention of the user, the second decoder 232 may use a previously learned learning model based on machine learning or deep learning.

As an example, the classification device 230 may delete buffer data stored in the first decoder 231, when the rehabilitation robot changes from an operation state to a stop state, and may delete buffer data stored in the second decoder 232, when the rehabilitation robot changes from the stop state to the operation state.

As an example, when the operation state (On/Off) of the rehabilitation robot changes, the classification device 230 may delete buffer data accumulated in the first decoder 231 or the second decoder 232 and may proceed with a new classification process using new data according to a changed brainwave state of the user.

The display 250 may display a real-time classification state for the motor intention of the user.

As an example, the display 250 may display whether the rehabilitation robot is in the operation state or the stop state in real time by means of a color.

As an example, the display 250 may display a green color, when the rehabilitation robot is in the operation state, and may display a red color, when the rehabilitation robot is in the stop state.

The user may intuitively identify the operation state of the rehabilitation robot by means of the color displayed on the display 250 and may reflect it to improve his or her motor intention.

As an example, the display 250 may display a step of classifying the motor intention of the user in real time by means of a graph.

As an example, the display 250 may display a step according to a real-time motor intention of the user among a predetermined number of classification steps by means of a graph.

The user may intuitively identify his or her current rehabilitation motor intention by means of the graph displayed on the display 250 and may reflect it to improve his or her motor intention.

As an example, the display 250 may display an operation or stop state of the rehabilitation robot by means of a color of the graph and may simultaneously display a classification step according to the motor intention of the user by means of the graph.

Figure 3:
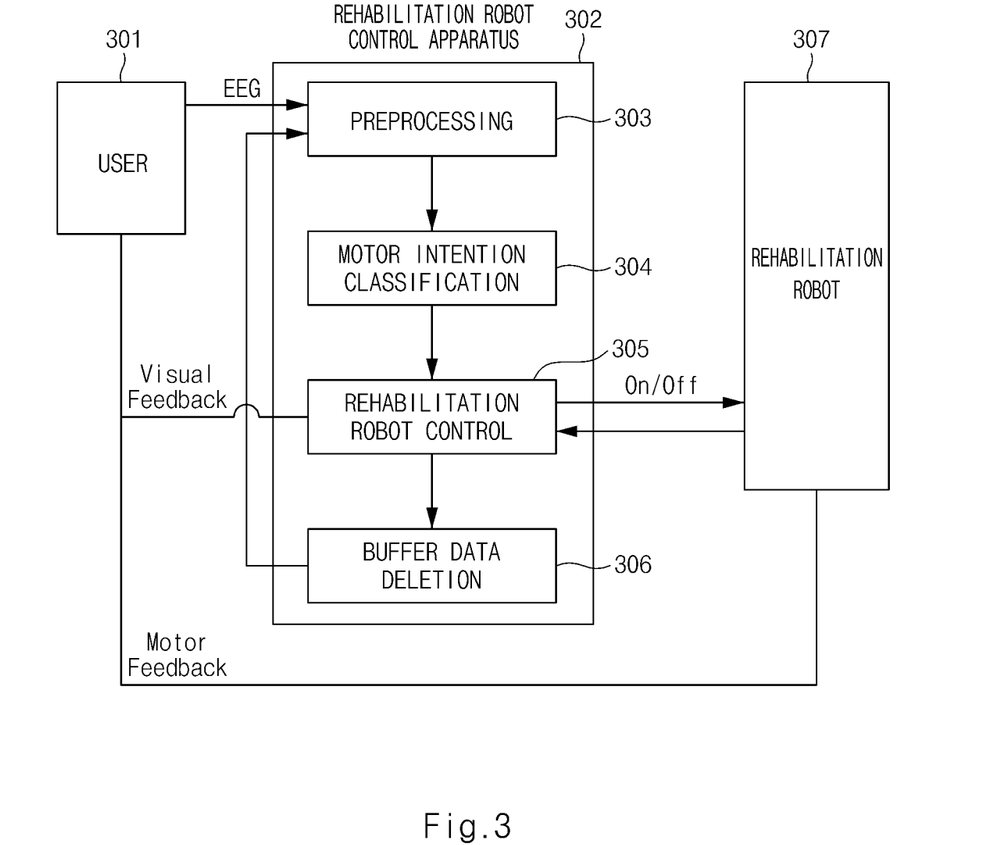
FIG. 3 is a drawing illustrating a relationship among a rehabilitation robot control apparatus, a user, and a rehabilitation robot according to an embodiment of the present disclosure.

FIG. 3 is a drawing illustrating a relationship among a rehabilitation robot control apparatus, a user, and a rehabilitation robot according to an embodiment of the present disclosure.

Referring to FIG. 3, a user 301 may provide a rehabilitation robot control apparatus 302 with information about real-time EEG.

The rehabilitation robot control apparatus 302 may perform preprocessing 303 for the real-time EEG signal of the user 301.

As an example, the rehabilitation robot control apparatus 302 may remove noise of the real-time EEG signal, may extract a signal characteristic, and may perform the preprocessing 303.

After performing the preprocessing 303 for the real-time EEG signal of the user 301, the rehabilitation robot control apparatus 302 may perform classification 304 for a motor intention of the user 301.

As an example, the rehabilitation robot control apparatus 302 may perform the classification 304 for the motor intention of the user 301, based on the EEG signal preprocessed by means of a previously learned learning model based on machine learning or deep learning.

After performing the classification 304 for the motor intention of the user 301, the rehabilitation robot control apparatus 302 may perform rehabilitation robot control 305.

As an example, the rehabilitation robot control apparatus 302 may control the On/Off state of a rehabilitation robot 307 depending on the result of performing the classification 304 of the motor intention of the user 301.

As an example, the rehabilitation robot control apparatus 302 may perform the rehabilitation robot control 305 and may display information about a classification state for the motor intention of the user 301 or information about an operation state or a stop state of the rehabilitation robot 307 to the user 301 to visually feed back the information to the user 301.

After performing the rehabilitation robot control 305, the rehabilitation robot control apparatus 302 may perform buffer data deletion 306.

When the operation or stop state of the rehabilitation robot 307 changes, the rehabilitation robot control apparatus 302 may perform the buffer data deletion 306 to proceed with an analysis of new data.

After performing the buffer data deletion 306, the rehabilitation robot control apparatus 302 may perform preprocessing 303 for the real-time EEG signal of the user 301 again.

When the rehabilitation robot 307 is controlled according to the motor intention of the user 301 by the rehabilitation robot control apparatus 302, the user 301 may perform a rehabilitation exercise depending on an operation of the rehabilitation robot 307 or may receive feedback by means of stopping of the rehabilitation exercise.

Thus, as a result, when controlling the rehabilitation robot 307 depending on the motor intention of the user 301, the rehabilitation robot control apparatus 302 may receive feedback on the rehabilitation exercise of the user 301, may enhance efficiency of rehabilitation treatment, and may enhance satisfaction of the user 301.

Figure 4:
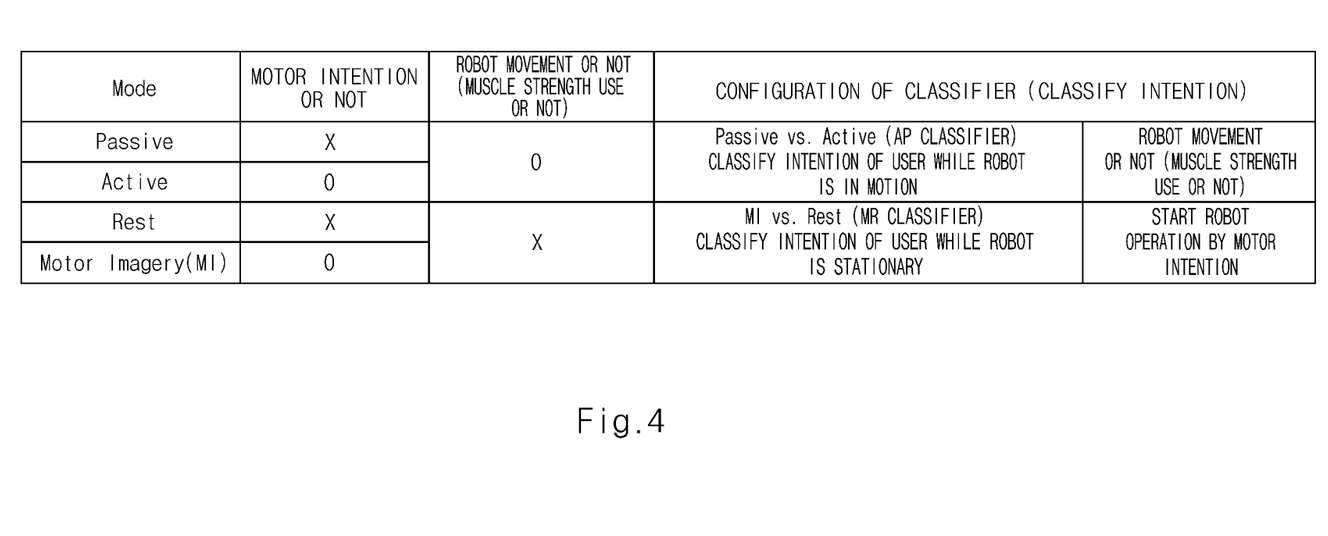
FIG. 4 is a table illustrating a process of classifying a motor intention of a user in a rehabilitation robot control apparatus according to an embodiment of the present disclosure.

FIG. 4 is a table illustrating a process of classifying a motor intention of a user in a rehabilitation robot control apparatus according to an embodiment of the present disclosure.

Referring to FIG. 4, a rehabilitation robot control apparatus 100, 200, or 302 of FIG. 1, 2, or 3 may classify a motor intention of a user as a passive mode, an active mode, a rest mode, or a motor imagery (MI) mode.

The passive mode may refer to a state where there is motion of a robot and there is no motor intention of the user.

The active mode may refer to a state where there is motion of the robot and there is a motor intention of the user.

The rest mode may refer to a state where there is no motion of the robot and there is no motor intention of the user.

The MI mode may refer to a state where there is no motion of the robot and there is a motor intention of the user.

According to the above-described four states, because a brainwave signal of the user is able to be formed in different patterns, the rehabilitation robot control apparatus 100, 200, or 302 may analyze the brainwave signal of the user to classify whether the brainwave signal is in any of the four states.

The rehabilitation robot control apparatus 100, 200, or 302 may analyze the brainwave signal of the user in the state where there is motion of the robot to determine whether to continue the operation of the robot by means of a motor intention of the user, and may control a rehabilitation robot depending on the determined result.

The rehabilitation robot control apparatus 100, 200, or 302 may analyze the brainwave signal of the user in the state where there is no motion of the robot to determine whether to start an operation of the robot by means of a motor intention of the user, and may control the rehabilitation robot depending on the determined result.

Figure 5:
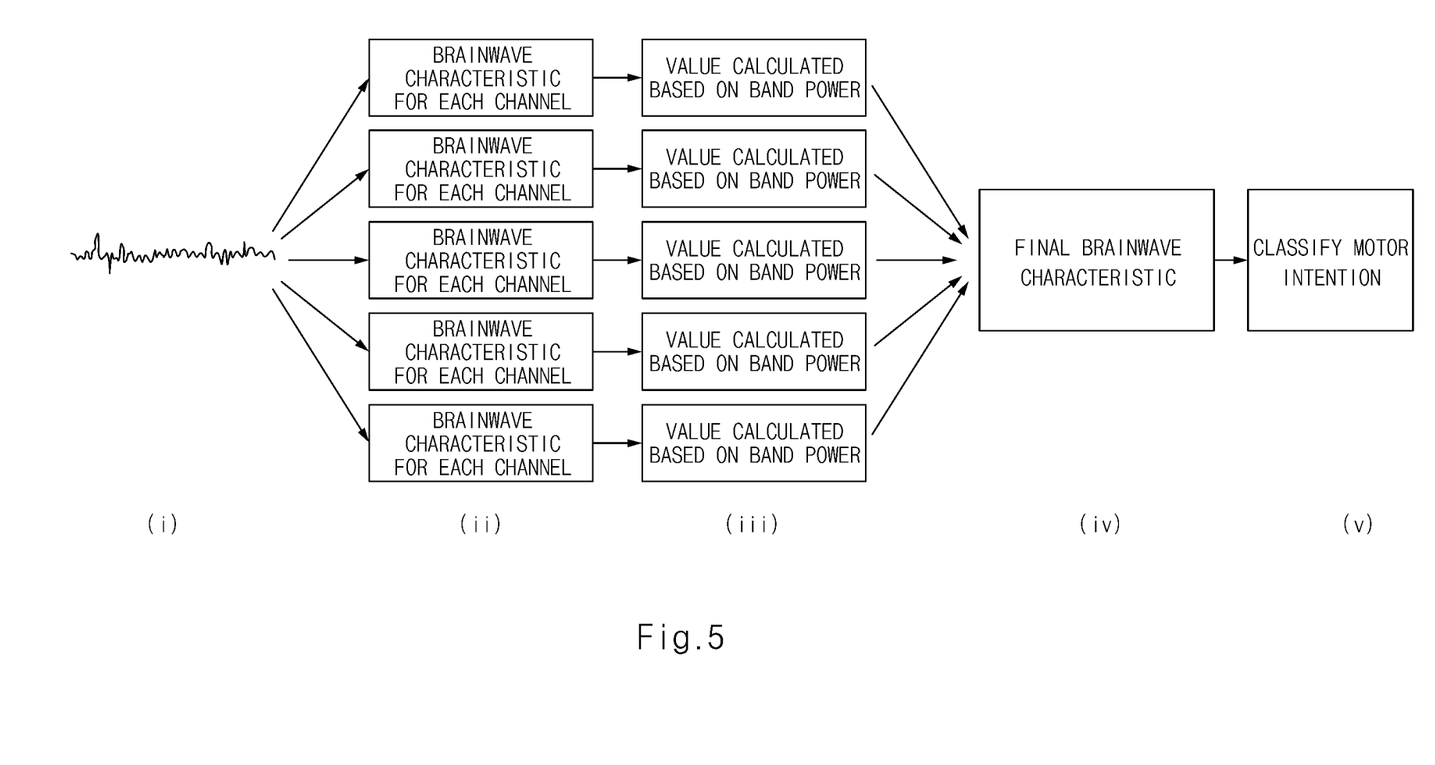
FIG. 5 is a drawing illustrating a process of classifying a motor intention of a user based on machine learning in a rehabilitation robot control apparatus according to an embodiment of the present disclosure.

FIG. 5 is a drawing illustrating a process of classifying a motor intention of a user based on machine learning in a rehabilitation robot control apparatus according to an embodiment of the present disclosure.

Step (i) of FIG. 5 is a drawing illustrating that a brainwave signal of a user is not preprocessed.

A rehabilitation robot control apparatus 100, 200, or 302 of FIG. 1, 2, or 3 may preprocess a brainwave signal of a user by means of a band pass filter, a notch filter, and a high pass filter in the preprocessing process.

Step (ii) of FIG. 5 illustrates data into which the brainwave signal of the user is converted for each channel.

The rehabilitation robot control apparatus 100, 200, or 302 may preprocess the brainwave signal of the user by means of conversion for time based on a predetermined window size and a degree to which a window is slid and overlapped.

Step (iii) of FIG. 5 illustrates a value calculated based on band powers of delta, theta, alpha, beta, and gamma after the brainwave signal of the user is converted for each channel.

The rehabilitation robot control apparatus 100, 200 or 302 may extract the sum of the band powers of delta, theta, alpha, beta, and gamma or the like as a brainwave characteristic, for each brainwave measurement channel.

Step (iv) of FIG. 5 illustrates one final value calculated based on the value calculated based on the band powers of delta, theta, alpha, beta, and gamma for each brainwave measurement channel.

Step (v) of FIG. 5 illustrates classifying a motor intention of the user by applying the one final value, calculated based on the value calculated based on the band powers of delta, theta, alpha, beta, and gamma for each brainwave measurement channel, as a brainwave characteristic, to a previously learned learning model.

The rehabilitation robot control apparatus 100, 200, or 302 may learn the learning model based on a brainwave characteristic extracted by means of conversion of extracting the brainwave characteristic, such that it is possible to classify a brainwave depending on a motor intention.

Herein, the window size and the degree to which the sliding window is overlapped may be determined as different random values.

Figure 6:
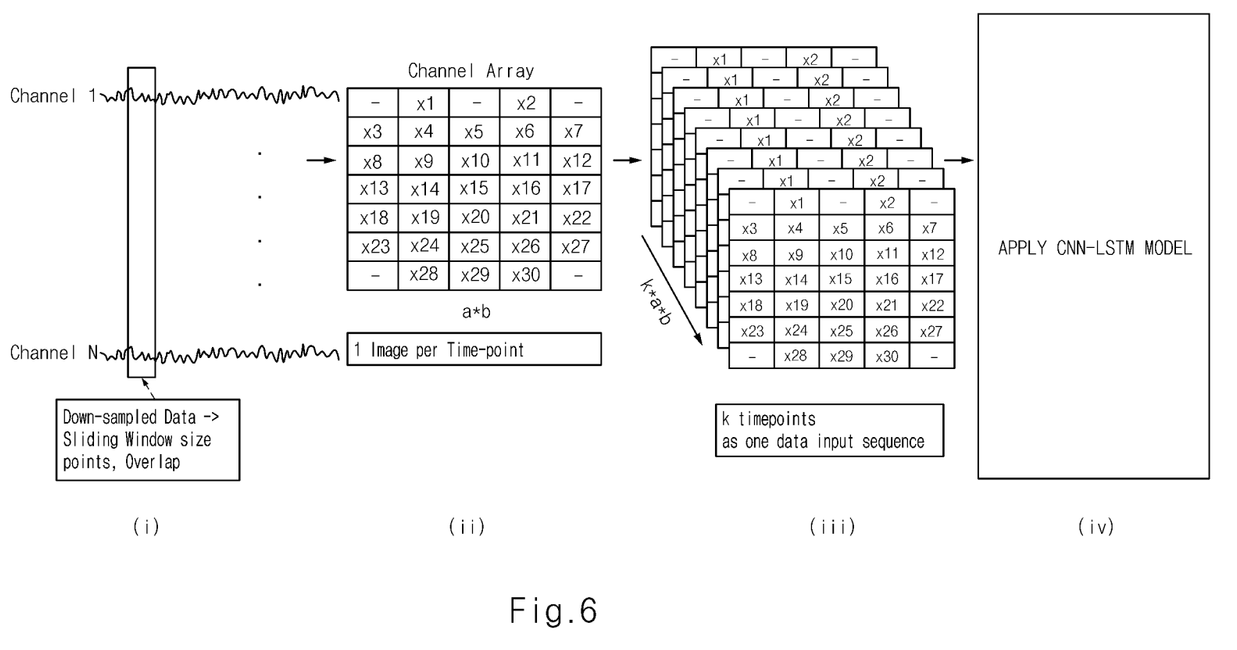
FIG. 6 is a drawing illustrating a process of classifying a motor intention of a user based on deep learning in a rehabilitation robot control apparatus according to an embodiment of the present disclosure.

FIG. 6 is a drawing illustrating a process of classifying a motor intention of a user based on deep learning in a rehabilitation robot control apparatus according to an embodiment of the present disclosure.

Step (i) of FIG. 6 illustrates a brainwave signal of a user for each channel.

A rehabilitation robot control apparatus 100, 200, or 302 of FIG. 1, 2, or 3 may preprocess a brainwave signal of the user by passing the brainwave signal of the user through a band pass filter, a notch filter, and a high pass filter in a preprocessing process and down sampling the brainwave signal.

The rehabilitation robot control apparatus 100, 200, or 302 may preprocess the brainwave signal of the user based on a predetermined window size and a degree to which a window is slid and overlapped.

Step (ii) of FIG. 6 illustrates that the measured brainwave signal data is converted into an image sequence in a channel array status with a predetermined size.

Step (iii) of FIG. 6 illustrates an image sequence of a channel array status with a predetermined size for every predetermined number of time points.

Step (iv) of FIG. 6 illustrates applying an image sequence of a channel array status with a predetermined size for every predetermined number of time points to a deep learning model based on a CNN and an LSTM.

The rehabilitation robot control apparatus 100, 200, or 302 may convert brainwave signal data measured on a predetermined number of channels into an image sequence of a channel array status with a predetermined size and may learn the deep learning model based on the CNN and the LSTM, such that it is possible to classify a brainwave depending on a motor intention.

Herein, a window size, a degree to which a sliding window is overlapped, and a size of a channel array may be determined as different random values.

Figure 7:
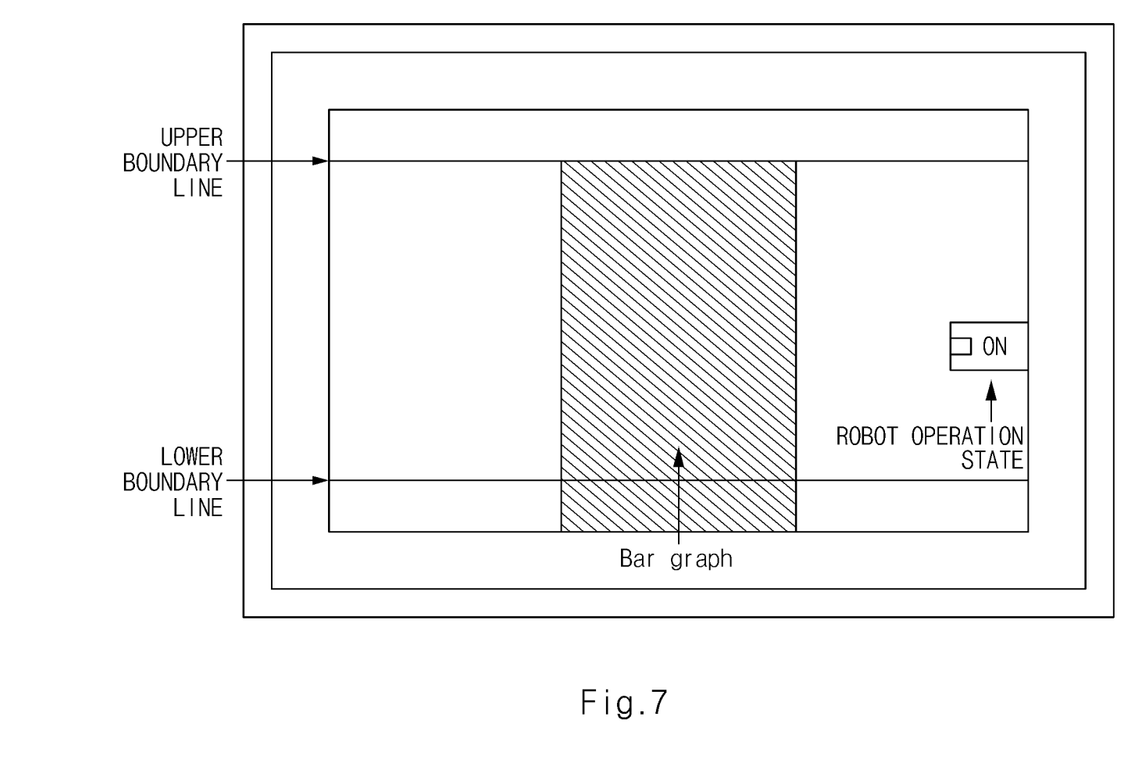
FIG. 7 is a drawing illustrating displaying a state where a rehabilitation robot control apparatus classifies a motor intention of a user on a display according to an embodiment of the present disclosure.

FIG. 7 is a drawing illustrating displaying a state where a rehabilitation robot control apparatus classifies a motor intention of a user on a display according to an embodiment of the present disclosure.

Referring to FIG. 7, a rehabilitation robot control apparatus 100, 200 or 302 of FIG. 1, 2, or 3 may display an upper boundary line, a lower boundary line, a bar graph, and a robot operation state on its display.

The rehabilitation robot control apparatus 100, 200, or 302 may display whether a rehabilitation robot is in an operation state or a stop state, by means of a color of the bar graph on the display.

As an example, the rehabilitation robot control apparatus 100, 200, or 302 may display the bar graph in a green color, when the rehabilitation robot is in the operation state, and may display the bar graph in a red color, when the rehabilitation robot is in the stop state.

As an example, the rehabilitation robot control apparatus 100, 200, or 302 may display the robot operation state by means of a character such as ON or OFF on the display.

As an example, the rehabilitation robot control apparatus 100, 200, or 302 may differently display a height of the bar graph depending on a real-time motor intention of a user.

As an example, the higher the motor intention of the user, the higher the rehabilitation robot control apparatus 100, 200, or 302 may display the height of the bar graph to be.

As an example, the rehabilitation robot control apparatus 100, 200, or 302 may classify the motor intention of the user into a predetermined number of steps and may differently display the height of the bar graph depending on the classified steps.

In a state where the rehabilitation exercise robot is stopped, when the red bar graph, the height of which is changed in real time, arrives at the upper boundary line, the rehabilitation robot control apparatus 100, 200, or 302 may operate the rehabilitation exercise robot, may change the color of the bar graph to a green color, and may display the robot operation state as ON.

In a state where the rehabilitation exercise robot is operating, when the green bar graph, the height of which is changed in real time, arrives at the lower boundary line, the rehabilitation robot control apparatus 100, 200, or 302 may stop the rehabilitation exercise robot, may change the color of the bar graph to a red color, and may display the robot operation state as OFF.

Although not illustrated, the rehabilitation robot control apparatus 100, 200, or 302 may represent the motor intention of the user or the operation or stop state of the robot in the form of another graph such as a pie chart.

Figure 8A:
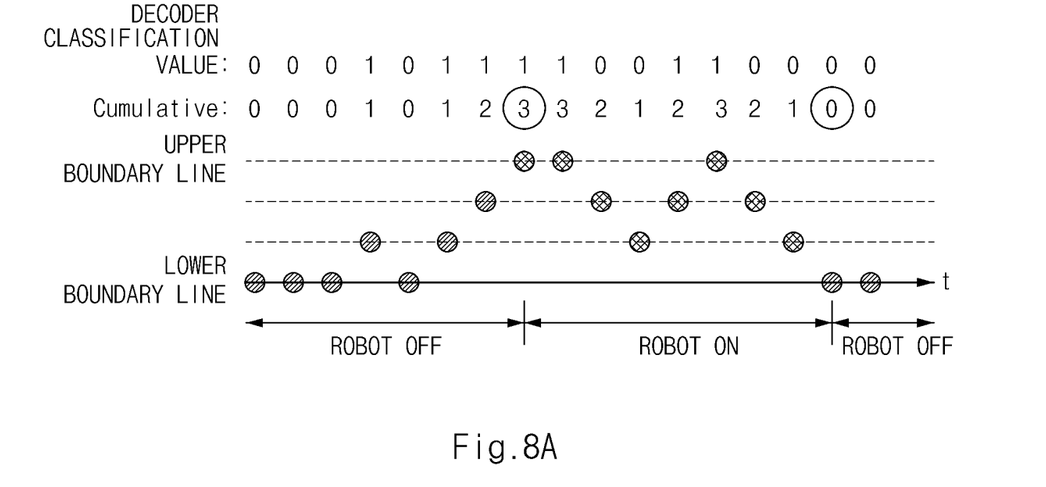
FIGS. 8A and 8B are drawings illustrating a process of calculating a state where a rehabilitation robot control apparatus classifies a motor intention of a user, which is displayed on a display, according to another embodiment of the present disclosure.
Figure 8B:
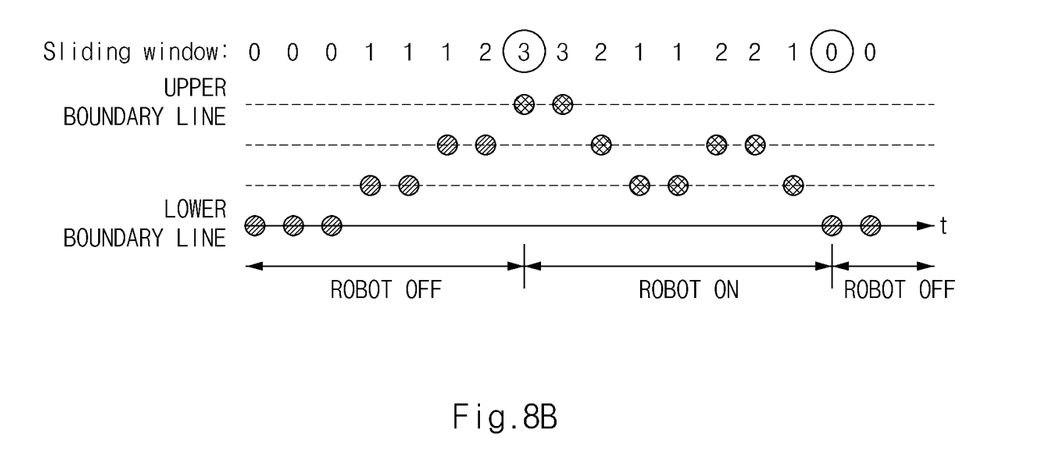

FIGS. 8A and 8B are drawings illustrating a process of calculating a state where a rehabilitation robot control apparatus classifies a motor intention of a user, which is displayed on a display, according to another embodiment of the present disclosure.

FIG. 8A illustrates that a rehabilitation robot control apparatus 100, 200, or 302 of FIG. 1, 2, or 3 represents consecutive classification values by means of a cumulative sum.

Herein, that the consecutive classification values are 0 refers to a state (a rest or passive mode) where there is no motor intention, and that the consecutive classification values are 1 refers to a state (an MI or active mode) where there is a motor intention.

The cumulative sum may refer to a scheme of calculating a classification step in a method where the classification step increases because the value is accumulated when the classification values are consecutively 1 and where the classification step decreases because the accumulated value decreases when the classification values are consecutively 0.

The rehabilitation robot control apparatus 100, 200, or 302 may output a classification value (a decoder classification value) on a periodic basis and may thus calculate the result of performing the cumulative sum of the classification values in real time.

When the predetermined upper threshold is 3 and when the predetermined lower threshold is 0, the rehabilitation robot control apparatus 100, 200, or 302 may change the color displayed on the display to a green color and may operate a rehabilitation robot, as soon as the cumulative sum arrives at a predetermined threshold.

As an example, the predetermined threshold may be determined as 3.

The rehabilitation robot control apparatus 100, 200, or 302 may change the color displayed on the display to a red color and may stop the rehabilitation robot, as soon as the cumulative sum arrives at 0 again.

FIG. 8B illustrates that the rehabilitation robot control apparatus 100, 200, or 302 represents consecutive classification values by means of a sliding window.

The sliding window may refer to a scheme which calculates a value, obtained by adding a predetermined of number of classification values which are recently calculated, as a classification step.

As an example, the predetermined number may be determined as 3.

The rehabilitation robot control apparatus 100, 200, or 302 may output a classification value on a periodic basis and may thus calculate a classification step calculated for the classification value in real time in a sliding window scheme.

When the predetermined upper threshold is 3 and when the predetermined lower threshold is 0, the rehabilitation robot control apparatus 100, 200, or 302 may change the color displayed on the display to a green color and may operate the rehabilitation robot, as soon as the classification step calculated in the sliding window scheme arrives at 3.

The rehabilitation robot control apparatus 100, 200, or 302 may change the color displayed on the display to a red color and may stop the rehabilitation robot, as soon as the classification step calculated again in the sliding window scheme arrives at 0 again.

The rehabilitation robot control apparatus 100, 200, or 302 may display such a process on the display to provide the user with visual feedback.

Figure 9:
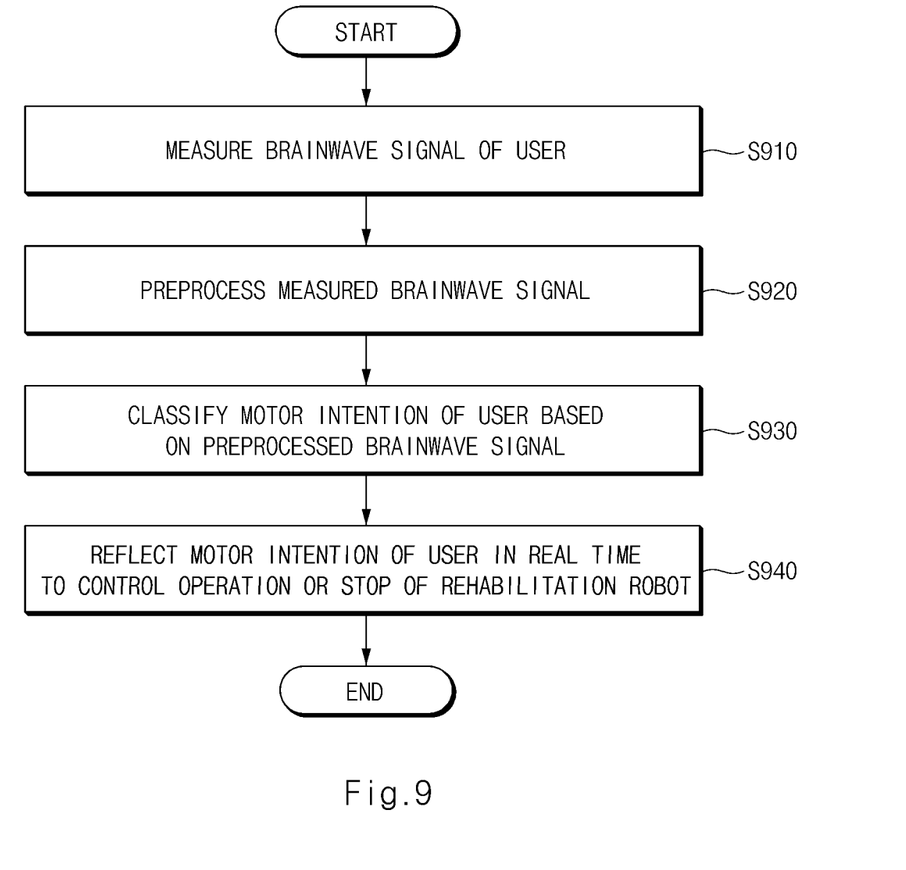
FIG. 9 is a flowchart illustrating a rehabilitation robot control method according to an embodiment of the present disclosure.

FIG. 9 is a flowchart illustrating a rehabilitation robot control method according to an embodiment of the present disclosure.

Referring to FIG. 9, the rehabilitation robot control method may include measuring (S910) a brainwave signal of a user, preprocessing (S920) the measured brainwave signal, classifying (S930) a motor intention of the user based on the preprocessed brainwave signal, and reflecting (S940) the motor intention of the user in real time to operate or stop a rehabilitation robot.

The measuring (S910) of the brainwave signal of the user may be performed by a brainwave signal measuring device 110 or 210 of FIG. 1 or 2.

The preprocessing (S920) of the measured brainwave signal may be performed by a preprocessing device 120 or 220 of FIG. 1 or 2.

The classifying (S930) of the motor intention of the user based on the preprocessed brainwave signal may be performed by a classification device 130 or 230 of FIG. 1 or 2.

As an example, the classifying (S930) of the motor intention of the user based on the preprocessed brainwave signal may include classifying, by the classification device 130 or 230, the motor intention of the user using a deep learning model based on a CNN, an RNN, or an LSTM, or a machine learning model based on an LDA or an SVM.

As an example, the classifying (S930) of the motor intention of the user based on the preprocessed brainwave signal may include classifying, by a first decoder 231 of FIG. 2, the motor intention of the user while the rehabilitation robot is operating and classifying, by a second decoder 232 of FIG. 2, the motor intention of the user while the rehabilitation robot is stopped.

As an example, the classifying (S930) of the motor intention of the user based on the preprocessed brainwave signal may include applying, by the classification device 130 or 230, a brainwave signal preprocessed by means of conversion of extracting a brainwave characteristic to a previously learned learning model to classify the motor intention of the user.

As an example, the classifying (S930) of the motor intention of the user based on the preprocessed brainwave signal may include applying, by the classification device 130 or 230, a brainwave signal converted into an image sequence to a previously learned learning model composed of a CNN or an LSTM to classify the motor intention of the user.

The reflecting (940) of the motor intention of the user in real time to operate or stop the rehabilitation robot may be performed by a controller 140 or 240 of FIG. 1 or 2.

As an example, the reflecting (940) of the motor intention of the user in real time to operate or stop the rehabilitation robot may include operating, by the controller 140 or 240, the rehabilitation robot, when the step of classifying the motor intention of the user arrives at an upper threshold in the state where the rehabilitation robot is stopped, and stopping, by the controller 140 or 240, the rehabilitation robot, when the step of classifying the motor intention of the user arrives at a lower threshold in the state where the rehabilitation robot is operating.

As an example, the rehabilitation robot control method may further include displaying, by a display 250 of FIG. 2, whether the rehabilitation robot is in an operation state or a stop state by means of a color and displaying, by the display 250, the step of classifying the motor intention of the user by means of a graph.

As an example, the rehabilitation robot control method may further include deleting, by the classification device 130 or 230, buffer data stored in the first decoder 231, when the rehabilitation robot changes from the operation state to the stop state, and deleting, by the classification device 130 or 230, buffer data stored in the second decoder 232, when the rehabilitation robot changes from the stop state to the operation state.

The operations of the method or the algorithm described in connection with the embodiments disclosed herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be given of effects of the rehabilitation robot control apparatus and the method thereof according to an embodiment of the present disclosure.

According to at least one embodiment of the present disclosure, the apparatus and the method may be provided to control the rehabilitation robot based on the brain computer interface (BCI).

According to at least one embodiment of the present disclosure, the rehabilitation robot control apparatus and the method thereof may be provided to analyze a brainwave of a patient and derive a more effective treatment effect by means of rehabilitation treatment in which an intention of the patient is reflected.

Furthermore, according to at least one embodiment of the present disclosure, the rehabilitation robot control apparatus and the method thereof may be provided to analyze a motor intention of a patient and continue a rehabilitation exercise with suitable strength, when the patient shows an active will for the rehabilitation exercise, to optimize an effect of the rehabilitation exercise.

Furthermore, according to at least one embodiment of the present disclosure, the rehabilitation robot control apparatus and the method thereof may be provided to control a rehabilitation exercise based on an intention of a patient in real time when the rehabilitation exercise is in progress, other than a process of starting the rehabilitation exercise in a stop state in a rehabilitation exercise process, thus enhancing satisfaction with the rehabilitation exercise of the patient.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A rehabilitation robot control apparatus comprising:
a processor; and
a memory with instructions stored thereon, wherein the instructions, when executed by the memory, enable to the apparatus to:

measure a brainwave signal of a user,
preprocess the measured brainwave signal by using a filter comprising a high pass filer, a band pass filter, and a notch filter, and by down sampling the brainwave signal,
preprocess the measured brainwave signal through conversion for time based on a predetermined window size and a degree to which a window is slid and overlapped,
receive information about whether a rehabilitation robot is operating or stopped,
extract a brainwave characteristic based on a band power for one or more brainwave measurement channels,
classify a motor intention of the user as a passive mode, an active mode, a rest mode or a motor imagery (MI) mode based on the brainwave signal,
classify the motor intention of the user while the rehabilitation robot is operating,
determine whether the user is in an active state in which the user has the motor intention or in a passive state in which the user does not have the motor intention while the rehabilitation robot is operating,
classify the motor intention of the user while the rehabilitation robot is stopped,
determine whether the user is in a motor imagery state in which the user has the motor intention or in a rest state in which the user does not have the motor intention while the rehabilitation robot is stopped,
convert the brainwave signal measured on a predetermined number of channels into an image sequence of a channel array status with a predetermined size and train a deep learning model based on a convolutional neural network (CNN) and a long short term memory (LSTM),
reflect the motor intention of the user in real time to control an operation or a stop of the rehabilitation robot, and
operate the rehabilitation robot, in response to a cumulative sum arriving at a predetermined threshold.

2. The rehabilitation robot control apparatus of claim 1, wherein the instructions, when executed by the processor, further enable the apparatus to classify the motor intention of the user using the deep learning model based on the CNN, a recurrent neural network (RNN), or the LSTM, or a machine learning model based on linear discriminant analysis (LDA) or support vector machine (SVM).

3. The rehabilitation robot control apparatus of claim 1, wherein the instructions, when executed by the processor, further enable the apparatus to:
use a first decoder to classify the motor intention of the user during an operation state of the rehabilitation robot; and
use a second decoder to classify the motor intention of the user during a stop state of the rehabilitation robot.

4. The rehabilitation robot control apparatus of claim 3, wherein the instructions, when executed by the processor, further enable the apparatus to:
delete buffer data stored in the first decoder in response to the rehabilitation robot changing from the operation state to the stop state; and
delete buffer data stored in the second decoder in response to the rehabilitation robot changing from the stop state to the operation state.

5. The rehabilitation robot control apparatus of claim 1, wherein the instructions, when executed by the processor, further enable the apparatus to:
operate the rehabilitation robot in response to classifying the motor intention of the user arriving at an upper threshold in a state where the rehabilitation robot is stopped; and
stop the rehabilitation robot in response to classifying the motor intention of the user arriving at a lower threshold in a state where the rehabilitation robot is operating.

6. The rehabilitation robot control apparatus of claim 1, wherein the instructions, when executed by the processor, further enable the apparatus to display a real-time classification state for the motor intention of the user.

7. The rehabilitation robot control apparatus of claim 6, wherein the instructions, when executed by the processor, further enable the apparatus to display whether the rehabilitation robot is in an operation state or a stop state in real time using a color system.

8. The rehabilitation robot control apparatus of claim 6, wherein the instructions, when executed by the processor, further enable the apparatus to display a step of classifying the motor intention of the user in real time using a graph.

9. The rehabilitation robot control apparatus of claim 1, wherein the instructions, when executed by the processor, further enable the apparatus to apply the preprocessed brainwave signal preprocessed by a process of conversion of extracting a brainwave characteristic to a previously trained learning model to classify the motor intention of the user.

10. The rehabilitation robot control apparatus of claim 1, wherein the instructions, when executed by the processor, further enable the apparatus to apply the brainwave signal converted and preprocessed into the image sequence to a previously trained learning model comprising the CNN or the LSTM to classify the motor intention of the user.

11. A rehabilitation robot control method, the method comprising:
measuring a brainwave signal of a user;
preprocessing the measured brainwave signal by using a filter comprising a high pass filter, a band pass filter, and a notch filter, and by down sampling the brainwave signal;
preprocessing the measured brainwave signal through conversion for time based on a predetermined window size and a degree to which a window is slid and overlapped;
receiving information about whether a rehabilitation robot is operating or stopped;
extracting a brainwave characteristic based on a band power for one or more brainwave measurement channels;
classifying a motor intention of the user as a passive mode, an active mode, a rest mode or a motor imagery (MI) mode based on the preprocessed brainwave signal;
classifying the motor intention of the user while the rehabilitation robot is operating;
determining whether the user is in an active state in which the user has the motor intention or in a passive state in which the user does not have the motor intention while the rehabilitation robot is operating;
classifying the motor intention of the user while the rehabilitation robot is stopped;
determining whether the user is in a motor imagery state in which the user has the motor intention or in a rest state in which the user does not have the motor intention while the rehabilitation robot is stopped;
converting the brainwave signal measured on a predetermined number of channels into an image sequence of a channel array status with a predetermined size and train a deep learning model based on a convolutional neural network (CNN) and a long short term memory (LSTM);

reflecting the motor intention of the user in real time to control an operation or a stop of the rehabilitation robot; and operating the rehabilitation robot, in response to a cumulative sum arriving at a predetermined threshold.

12. The method of claim 11, wherein classifying the motor intention of the user comprises classifying the motor intention of the user using the deep learning model based on the CNN, a recurrent neural network (RNN), or the LSTM, or a machine learning model based on linear discriminant analysis (LDA) or support vector machine (SVM).

13. The method of claim 11, wherein classifying the motor intention of the user comprises:

classifying, by a first decoder, the motor intention of the user while the rehabilitation robot is operating; and classifying, by a second decoder, the motor intention of the user while the rehabilitation robot is stopped.

14. The method of claim 13, further comprising:

deleting first buffer data stored in the first decoder in response to the rehabilitation robot changing from an operation state to a stop state; and deleting second buffer data stored in the second decoder in response to the rehabilitation robot changing from the stop state to the operation state.

15. The method of claim 11, further comprising:

displaying whether the rehabilitation robot is in an operation state or a stop state in real time using a color system; or displaying a step of classifying the motor intention of the user in real time using a graph.

16. The method of claim 11, wherein reflecting the motor intention of the user in real time to control the operation or the stop of the rehabilitation robot comprises:

operating the rehabilitation robot in response to a step of classifying the motor intention of the user arriving at an upper threshold in a state where the rehabilitation robot is stopped; and stopping the rehabilitation robot in response to the step of classifying the motor intention of the user arriving at a lower threshold in a state where the rehabilitation robot is operating.

17. The method of claim 11, wherein classifying the motor intention of the user comprises applying the brainwave signal preprocessed by conversion of extracting a brainwave characteristic to a previously trained learning model to classify the motor intention of the user.

18. The method of claim 11, wherein classifying the motor intention of the user comprises applying the brainwave signal converted and preprocessed into the image sequence to a previously trained learning model comprising the CNN or the LSTM to classify the motor intention of the user.

19. A non-transitory computer readable medium with instructions stored thereon, wherein the instructions, when executed by a processor, enable the processor to perform the steps of:

measuring a brainwave signal of a user;

preprocessing the measured brainwave signal by using a filter comprising a high pass filter, a band pass filter, and a notch filter, and by down sampling the brainwave signal;

preprocessing the measured brainwave signal through conversion for time based on a predetermined window size and a degree to which a window is slid and overlapped;

receiving information about whether a rehabilitation robot is operating or stopped;

extracting a brainwave characteristic based on a band power for one or more brainwave measurement channels;

classifying a motor intention of the user as a passive mode, an active mode, a rest mode or a motor imagery (MI) mode based on the preprocessed brainwave signal;

classifying the motor intention of the user while the rehabilitation robot is operating;

determining whether the user is in an active state in which the user has the motor intention or in a passive state in which the user does not have the motor intention while the rehabilitation robot is operating;

classifying the motor intention of the user while the rehabilitation robot is stopped;

determining whether the user is in a motor imagery state in which the user has the motor intention or in a rest state in which the user does not have the motor intention while the rehabilitation robot is stopped;

converting the brainwave signal measured on a predetermined number of channels into an image sequence of a channel array status with a predetermined size and train a deep learning model based on a convolutional neural network (CNN) and a long short term memory (LSTM);

reflecting the motor intention of the user in real time to control an operation or a stop of the rehabilitation robot; and operating the rehabilitation robot, in response to a cumulative sum arriving at a predetermined threshold.

20. The non-transitory computer readable medium of claim 19, wherein classifying the motor intention of the user comprises classifying the motor intention of the user using the deep learning model based on the CNN, a recurrent neural network (RNN), or the LSTM, or a machine learning model based on linear discriminant analysis (LDA) or support vector machine (SVM).

* * * * *